(12) United States Patent
Pendarakis et al.

(10) Patent No.: US 7,711,821 B2
(45) Date of Patent: May 4, 2010

(54) MULTIPLE RESOURCE CONTROL-ADVISOR FOR MANAGEMENT OF DISTRIBUTED OR WEB-BASED SYSTEMS

(75) Inventors: Dimitrios Pendarakis, Westport, CT (US); Jeremy I. Silber, New York, NY (US); Laura Wynter, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 990 days.

(21) Appl. No.: 11/444,162

(22) Filed: May 31, 2006

(65) Prior Publication Data
US 2007/0283016 A1 Dec. 6, 2007

(51) Int. Cl.
G06F 15/173 (2006.01)
(52) U.S. Cl. .................................. 709/226; 709/224
(58) Field of Classification Search ................. None
See application file for complete search history.

(56) References Cited

U.S. PATENT DOCUMENTS

| | | | |
|---|---|---|---|
| 6,584,488 B1 * | 6/2003 | Brenner et al. .............. | 718/103 |
| 7,062,559 B2 * | 6/2006 | Yoshimura et al. .......... | 709/226 |
| 7,225,223 B1 * | 5/2007 | McCarthy et al. .......... | 709/204 |
| 2003/0061262 A1 * | 3/2003 | Hahn et al. ................ | 709/104 |
| 2005/0086645 A1 * | 4/2005 | Diao et al. ................. | 717/127 |

(Continued)

OTHER PUBLICATIONS

Multivariable Mathematics, Linear Algebra Calculus and Differential Equations, Second Edition, by Richard E. Williamson and Hale F. Trotter, Published by Prentice-Hall, INC. in 1979, p. 201-203.*

(Continued)

*Primary Examiner*—Joseph E Avellino
*Assistant Examiner*—Dung Huynh
(74) *Attorney, Agent, or Firm*—George Willinghan; August Law, LLC

(57) ABSTRACT

A system and method are provided for autonomic system management in a computing system containing system resources including network resources and multiple resource demands, or processes. The computing system may be a stream-processing system or other real-time computer management system, such as workload management, or a virtualization engine. The system and method enables achieving a better level of performance than would occur in the computing system using only existing mechanism. It permits, with very low computational overhead, achieving or driving the system closer to a user-defined system performance objective. To do so, a system performance equation is defined to determine a level of performance of the system as a function of the allocation of two or more system resources among a plurality of system resource demands or processes. From this system performance equation, a plurality of resource-specific change equations is derived. Each resource-specific change equation is capable of calculating changes in the level of performance of the system attributable to changes in the allocation of one of the system resources. The resource-specific change equation yielding the greatest change in the level of system performance at a given allocation of all of the system resources and the system resource associated with the identified resource-specific change equation are identified. The allocation of the identified associated system resource to at least one system resource demand to provide the largest increase in the level of performance of the system, and allocations for all system resources are adjusted in accordance with the modified allocation of the identified associated system resource.

1 Claim, 2 Drawing Sheets

U.S. PATENT DOCUMENTS

2005/0111488 A1*   5/2005   Subramanian et al. ...... 370/468
2005/0198102 A1*   9/2005   Hahn et al. ................. 709/200
2006/0280161 A1   12/2006   Liu et al.

OTHER PUBLICATIONS

U.S. Appl. No. 11/327,069, Method for Autonomic System Management Using Adaptive Allocation of Resources, filed Jan. 6, 2006.

U.S. Appl. No. 10/853,845, Systems and Methods for Providing Constrained Optimization Using Adaptive REgulatory Control, filed May 25, 2004.

U.S. Appl. No. 10/688,742, Methods and Ssytems for Control Discovery in Computing Systems, filed Oct. 17, 2003.

http://publib-b.boulder.ibm.com/abstracts/sg246785.html?Open, Redbook Abstract, IBM Enterprise Workload Manager V2.1, too voluminous to contain.

http://www.aurema.com.au/products/technology.php, Aurema's Enterprise Infrastructure Management solution is built on a proprietary technology called Application Resource Mngt.

RTO Software, Addressing Terminal Server Scalability and Performance, Apr. 2003,(Rev. 1.0).

http://www.bsiopti.com/owinfo.html, Opti-Workload Fact Sheet, Manage CPU Bottlenecks with Opti-Workload, 1996.

http://research.microsoft.com/~jamesrh/hpts2001/submissions/AnnRhee.pdf, A.RHEE,The Oracle Database Resource Manager: Scheduling CPU Resources at the Application Level.

I.Subramanian,C. McCarthy, M. Murphy, Meeting Performance Goals with theHP-UX Workload Manager, Oracle Corp .,Redwood, California.

* cited by examiner

MULTIPLE RESOURCE CONTROL-ADVISOR FOR MANAGEMENT OF DISTRIBUTED OR WEB-BASED SYSTEMS

STATEMENT REGARDING FEDERALLY SPONSORED RESEARCH

The invention disclosed herein was made with U.S. Government support under Contract No. H98230-04-3-0001 awarded by the U.S. Department of Defense. The Government has certain rights in this invention.

FIELD OF THE INVENTION

The present invention is directed to the field of resource management in large-scale distributed information technology systems.

BACKGROUND OF THE INVENTION

In distributed computer or information technology (IT) systems, the distribution of network and process resources, for example the location of resources, storage replication, load balancing and functionality, is transparent to users of these systems. Creation of this transparency is provided by the utilization of system resources in conjunction with network resources, e.g. bandwidth. These resources need to be effectively managed to provide the level of service that users of the system require. Effective management of these resources includes the allocation of sufficient amounts of resources to handle service demand patterns that are typically "bursty" and unpredictable. Conversely, these resources should not be over-provisioned so as to increase utilization and consequently cost efficiency of the IT system.

Resource management in large-scale, distributed IT systems faces a number of challenges. Current service models, for example grid and utility computing, increase the complexity of resource management by creating highly "bursty" and unpredictable resource demand patterns. In fact, these demand patterns are very difficult to anticipate or to characterize in advance. A critical component of the successful operation of these service models, however, is the ability to meet service level agreements (SLA's) for application performance. Therefore, resource management approaches were developed in an attempt to meet SLA's in an unpredictable resource demand environment. Conventional resource management approaches allocate system resources according to the statistical expectations of application resource demands, producing a theoretical bound on the probability of an SLA breach. By contrast, a dynamic resource manager monitors the performance of the IT system and the utilization of system resources, adjusting the allocation of resources when system operation is deemed to be off-target, or not meeting the prescribed SLA's.

In general, a resource manager acts upon the available controls that are used to apply scheduling methods to regulate and order the use of resources by the various applications. For example, a process scheduling function is used to proportion the processing resource, i.e. the central processing unit (CPU), among the various processes being executed by that processing resource. The resource manager proposes changes to this proportioning upon a determination that certain performance objectives are not being fulfilled.

Dynamic resource managers control various types of system resources, for example processing resources, e.g. CPU cycles or processing power, main memory, disk space and network resources, e.g. communication bandwidth and network buffers. Conventional approaches managed processing resources and networking resources independently, generally ignoring the complex dependency between availability and utilization of each one of these types of resources. In fact, prevailing approaches to performance-based resource management in distributed IT systems control processing resources and assume that network capacity is over-provisioned. This assumption only holds true in systems where the deployed applications are very computation intensive and have limited communication requirements. In those types of systems, network capacity could be ignored since it would never represent a potential resource bottleneck. As such, network resources and protocols are largely independent of the resource managers used in on-demand, distributed computing systems.

However, as distributed IT systems expand in size and geographic scale, make increased use of public and wide area networks and cope with unpredictable demands created by new application models such as grid computing, utility computing and multimedia stream processing, network resource management has become an important part of system management. Computing systems in use today combine public and wide-area networks with on-demand allocation of resources, e.g. multimedia streams. This combination results in the transfer of large amounts of data over substantial distances, and the communication or network resources used to transfer these data are not over-provisioned but result in a bottleneck. Therefore, network resources contribute a degree of unpredictability to the effective management of network resources, and the management of this unpredictability has become critical to overall system management.

Workload managers working in conjunction with load balances need to provide a level of control of system and resources that is fine enough to ensure the SLA guarantees, even in the presence of randomness, bursty usage patterns and public network limitations. Various algorithms have been proposed to address the desired level of control over system and network resources. One method uses sophisticated optimization techniques to quickly achieve the necessary bandwidth operating level that allows a system to reach a target processing level. The method relies on very low-overhead computations and at the same time provides a highly stable and robust approach to reaching the desired operating level. These methods, however, fail to treat multiple resources simultaneously and to take into account complex dependencies among the resources.

Therefore, systems and methods are needed that control network resource allocation to achieve application performance objectives and to achieve the desired use of the computer resources. These systems and methods would explicitly take into account the complex dependency between availability and utilization of each one of the types of resources in the system, both processing resources and network resources.

SUMMARY OF THE INVENTION

Exemplary systems and methods in accordance with the present invention treat multiple resources simultaneously and take into account the joint effect of these resources on the desired system management goal, for example as expressed in a Service Level Agreement (SLA). Algorithms utilized in accordance with the present invention allow the discovery of the complex interactions between the multiple resources and the desired system management goal. In one embodiment, these multiple resources include network bandwidth, processing power, e.g. central processing unit (CPU) share allocated to an application and memory allotted to an application, and the desired management goal expressed as performance parameters for the response time of web-based requests.

Because of the interactions across and among the multiple resources, certain combinations of resource allocation levels are infeasible, i.e. the allocations cannot be used by the application at the prescribed levels. For example, if a bandwidth resource manager provides the directive to allocate 5% of the bandwidth to a given application so as to reach its operating goal, and a separate CPU resource manager stipulates allocating a share of 40% of the CPU to that application to reach its goal, not only may the combination of 5% bandwidth and 40% CPU fail to ensure reaching the goal, but it may not even be feasible. In other words, it may be impossible for the application to consume 40% of the CPU when 5% of the bandwidth is provided to it. The outcome is not only failing to meet the desired goal but is wasting resources since the allocation given to that application is not usable by the application and is not transferable to any other application. In addition, conditions exist in which one resource is not responsive to control but another one is. Given the number of resources, the potential combinations of allocation levels are exponential in number and the joint effects among these multiple resources are highly complex.

To accommodate the exponential number of allocation combinations and to account for these complex joint effects, exemplary systems and methods in accordance with the present invention consider the interactions across resources. Since considering jointly the interactions of all resources is too costly in terms of computational overhead to be usable in a real-time environment, algorithms are used that determine joint behavior among the resources with respect to a desired system management goal only in a region of interest. In addition, the algorithm maintains minimal information to reduce the computational costs. Systems and methods in accordance with the present invention contain features to ensure robust operation in the presence of the real-time perturbations that are always present at the system level in which the algorithm operates. The algorithm reacts to the desired system management goal without oscillatory behavior that could result from changes to the resources.

In accordance with one exemplary embodiment, a method for autonomic system management in accordance with the present invention includes defining a system performance metric to evaluate a level of performance of an autonomic system based on the allocation of two or more system resources among a plurality of system resource demands. In defining the system performance metric, substantially all of the resource demands within the autonomic system are identified, and an expression of the allocation of the system resources among the identified resource demands is included in the system performance metric. Identification of the resource demands includes identifying applications running on the autonomic system, processes running on the autonomic system, users of the autonomic system, databases on the autonomic system, input devices in the autonomic system, output devices in the autonomic system, dependent system resources, controlled system resources and combinations thereof. Alternatively, defining the system performance metric involves defining a system performance equation.

The system performance metric is used to derive a plurality of resource-specific expressions. Each resource-specific expression is capable of expressing changes in the level of performance of the system attributable to changes in the allocation of one of the system resources. When the system performance metric is a system performance equation, derivation of the resource-specific expressions involves calculating a plurality of partial derivatives of the defined system performance equation, where each partial derivative taken with respect to the allocation of one of the system resources.

The resource-specific expression yielding the greatest change in the level of system performance at a given allocation of system resources is identified. When the resource-specific expression is a resource-specific equation, identification of the resource-specific expression yielding the largest change involves identifying the partial derivative yielding the largest absolute value when evaluated at the system operating point. For example, a system operating point containing a set of system resource allocations among the plurality of resource demands is identified, and each partial derivative is evaluated at that system operating point. Having identified the resource-specific expression, the system resource associated with the identified resource-specific expression is modified, and the allocation of the identified associated system resource is modified for at least one system resource demand to provide an increase in the level of performance of the autonomic system. The allocations of the other system resources are adjusted as needed in accordance with the modified allocation of the identified associated system resource.

In one embodiment, the number of system resources available to be controlled and to be allocated to the identified resource demands is identified so that number of resource-specific expressions derived from the performance metric is equal to the determined number of system resources.

In one embodiment, a system operating point containing a set of system resource allocations among the plurality of resource demands is identified, and each resource-specific expression is evaluated at the system operating point. In one embodiment, identification of the resource-specific expression yielding the largest change includes identifying the resource-specific expression yielding the largest absolute value when evaluated at the system operating point. In one embodiment, the method also includes determining a relationship between the identified associated system resource and the level of performance of the system. This relationship is optimized to determine the allocation of the identified associated system resource, such that the step of modifying the allocation of the identified associated system resource also includes modifying the allocation of the identified associated system resource in accordance with the relationship optimization. In one embodiment, adjusting allocations for all system resources includes creating a system operating point containing a set of system resource allocations among the plurality of resource demands and adjusting all system resources in accordance with the system operating point.

DETAILED DESCRIPTION

Exemplary systems and methods in accordance with the present invention enforce system performance goals, as expressed for example in service level agreements (SLA's), in autonomic computing systems through the allocation of multiple resources among multiple resource demands while taking into account the inter-relationships among the various resources. These inter-relationships result from the concurrent operation of multiple system resource demands and the associated simultaneous demands on each system resource.

Figure 1:
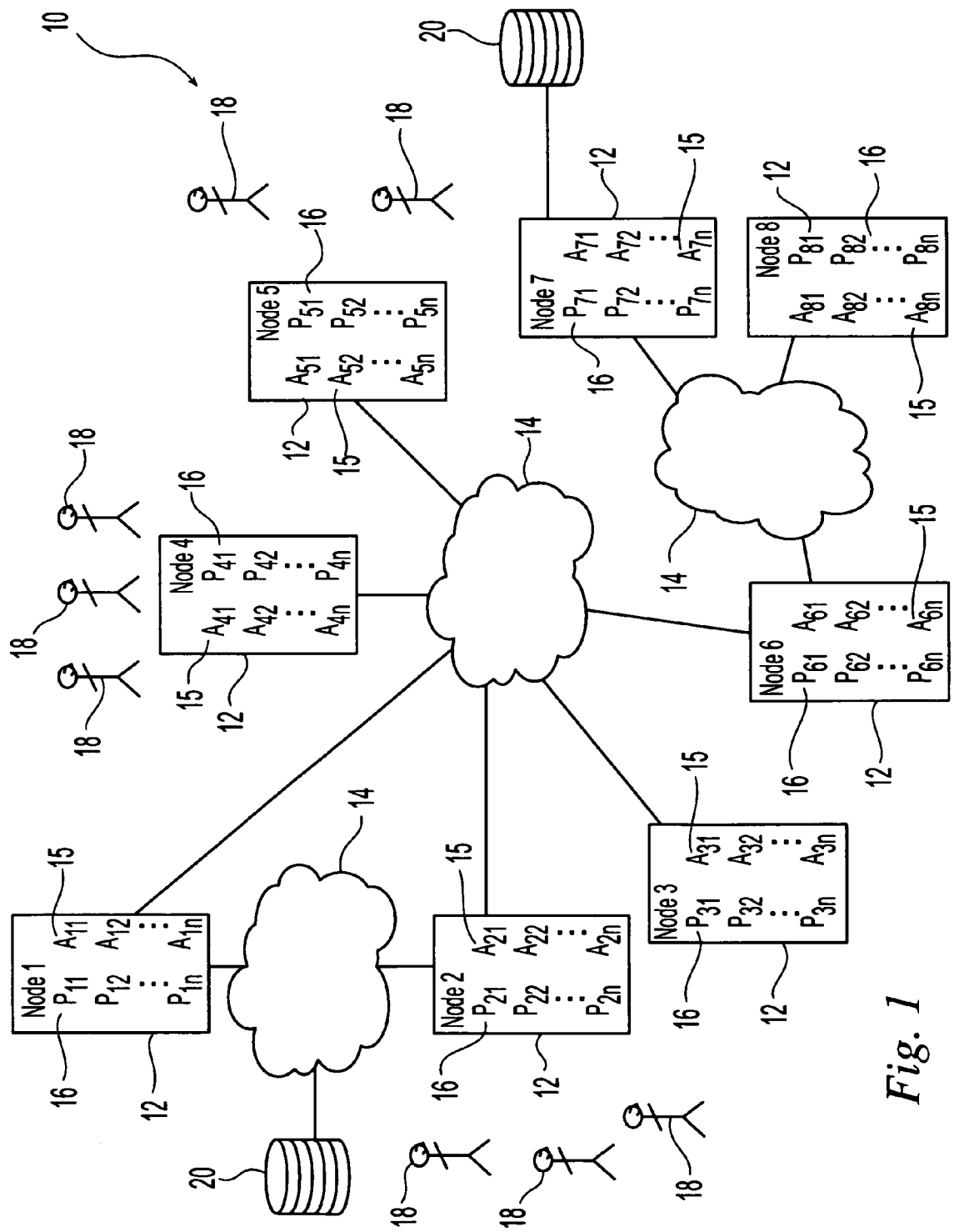
FIG. 1 is a schematic representation of an embodiment of a autonomic computing system for use in accordance with the present invention.

Referring initially to FIG. 1, an example of an autonomic computing system 10 for use in exemplary embodiments of the present invention is illustrated. Suitable autonomic computing systems 10 can be arranged, for example, as information technology (IT) systems, distributed networks, local area networks and peer-to-peer networks. As illustrated, the autonomic computing system 10 includes a plurality of distributed nodes 12, computers or servers that are in communication with each other across one or more networks 14. A plurality of system users 18 can be disposed at one or more of the nodes to utilize the resources of the system 10. Suitable networks 14 include, but are not limited to, local area networks such as Ethernet networks, wide area networks such as the Internet, secure local and wide area networks, secure wireless networks, enterprise-wide networks, storage area networks, virtual private networks, secure virtual private networks, internet area networks, internet secure networks, personal area networks and combinations thereof.

The nodes 12 can be servers or computers arranged in either a centralized or peer-to-peer network structure. In one embodiment, each node 12 contains at least one logical processor, for example a central processing unit (CPU) that is capable of executing one or more of a plurality of applications 15, processes or programs 16 that are run on that node or computer. These applications 15, processes and programs 16 provide the various functionalities of the autonomic computing system 10. The nodes or computers send and receive data flows through the network for the applications and processes running on those computers. Each node can also contain one or more storage mediums to store the executable code for performing the applications 16 and to store other data. In addition, the autonomic computing system 10 can contain one or more databases 20 or other storage mediums in communication with the various nodes either directly or across the networks.

The various components of the autonomic computing system 10 that are available to provide the functionalities or services of the computing system 10 constitute the available system resources that can be allocated among a variety of system resource demands. For example, each node 12 contains a plurality of processing resources, e.g. CPU, and memory resources that are allocated for the execution of the applications 15 and processes 16, i.e. resource demands, running on that node. These processing resources may or may not be managed by an existing resource manager. In addition to resources disposed within or associated with a node such as processing resources, the autonomic computing system 10 includes network resources, e.g. communication network bandwidth and network buffer space, that are utilized in the movement of data, i.e. data flows, among the various nodes 12 of the system 10. These network resources are part of the entirety of system resources that can be allocated among the various resource demands of the system. The utilization and availability of all system resources including both processing resources and network resources affect the level of performance of the autonomic computing system. These system resources include controllable resources, i.e. resources that can have their allocation among the various resource demands actively controlled, and dependent resources, i.e. resources where the allocation or utilization are dependent upon and determined from the allocation of the controlled resources.

All of the various resource demands operate concurrently and compete for system resources. In addition, interrelated utilization of the various system resources adds complexity to the allocation of these resources among the resource demands. For example, distributed applications running on various nodes send and receive data among different nodes, consuming both processing resources and network resources. Utilization of both of these types of resources is not only concurrent but interdependent. Utilization of processing resources and application performance are affected by the availability and utilization of network resources. For example, if a given application is at point where it needs to send large amounts of data across the network and the currently available network bandwidth is low, then the application performance decreases, even if the amount of processor allocated to the application is sufficient to execute the necessary computations. Not only will application performance decrease, but the processor power allocated to the application will either be allocated to some other application, or in some instances may go unused while the application waits for the necessary data to perform the computations. Therefore, interdependency exists between the utilization of processing resources and the utilization of network resources. This interdependence also affects the realization of the desired level of performance of the system. Therefore, improvement or optimization of system performance involves improvement or optimization of the allocation of a variety of interrelated system resources among the variety of simultaneous resource demands. In accordance with exemplary embodiments of the present invention, system complexity and the inter-relationships among the system resources are accounted for by taking into account all of the system resources at the same time. Hence, the allocation of all system resources, including processing resources and network resources, are controlled to achieve the desired level of system performance.

Exemplary methods in accordance with the present invention optimize, or at least improve in the direction of optimization, the allocation of system resources among the various system resource demands while taking into account the inter-relationships among the system resources. Therefore, the desired level of performance of the system, for example as expressed in a service level agreement (SLA), is achieved.

Figure 2:
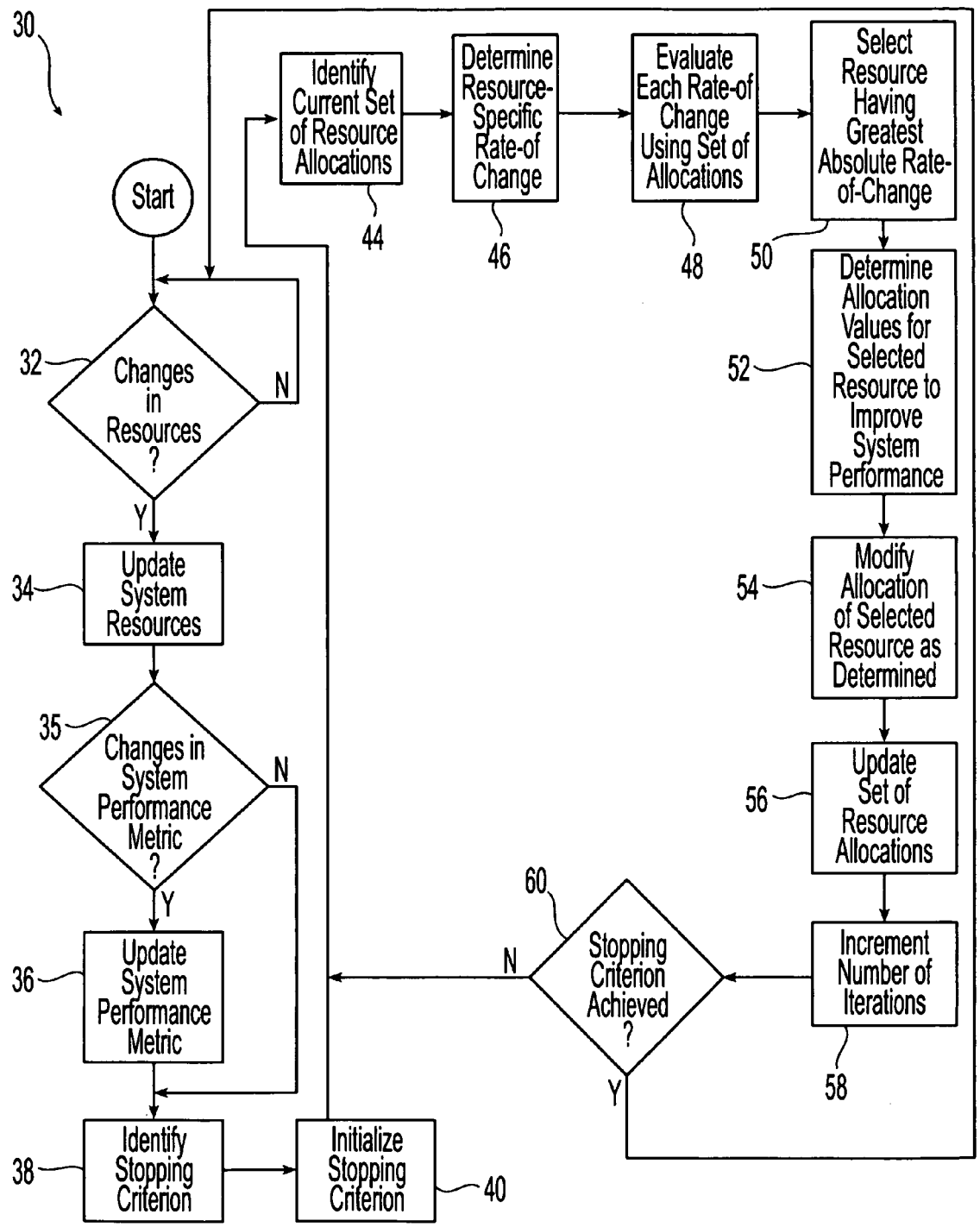
FIG. 2 is a flow chart illustrating an embodiment of a method for autonomic system management in accordance with the present invention.

Referring to FIG. 2, an exemplary embodiment of a method for autonomic system management using adaptive joint learning and optimization 30 in accordance with the present invention is illustrated. Initially, a check is made to determine if there are any changes, i.e. additions or subtractions, in the resources or resources demands 32 of the autonomic system. If changes exist, then the identified resources and resource demands and their associated counts are updated 34. Next, a determination is made about whether or not any changes are required in the system performance metric 35 to be used in evaluating the performance of the autonomic system. If changes are required, the system performance metric is modified accordingly 36.

As illustrated, the method for autonomic system management 30 is operated as a continuous loop and in particular as an outer loop and an inner loop. The outer loop monitors for changes in system resources and system performance metrics. The inner loop performs changes to resource allocations to improve system performance. As illustrated, any identifiable change in system resources or resource demands is used as the trigger to perform changes to the allocation as system resources. No changes to system resource allocations occur until a change in system resources or system resource demands is detected. A check is then made to see if changes in the system performance metric are required. However, the resource allocation loop is performed regardless of whether or not the performance metric is changed. Therefore, the resource allocation loop is performed with either the existing metric or a modified metric. Other embodiments of the present invention can use changes in the system performance metric as the trigger to enter the resource allocation loop or changes to both the system resources and performance metrics as the trigger to enter the resource allocation loop, or any number of triggers can be used to enter the resource allocation loop, including one based on some event, or time-related criterion. Note that if no change is needed in a resource allocation, in that it cannot be improved, then the inner loop will run without proposing changes to the resource allocation. In addition, steps can be included for the initialization of the system resources, system resource demands and system performance metric to be used upon the initiation of a given autonomic system.

As used herein, the system resource demands within the system 32 include all resource demands within the autonomic system. These resource demands include, but are not limited to, persons or users, equipment, processes and software that utilize one or more system resources. For example, the identification of all resource demands includes identifying applications running on the system, processes running on the system, users of the system, databases on the system, input devices in the system, output devices in the system, dependent system resources, controlled system resources and combinations thereof. The resource demands also include system resources, both controlled resources and dependent resources. In addition to being identified, the number of resource demands within the system can be identified and represent by a number, n.

The system resources identified within the autonomic system include, but are not limited to, controlled resources, i.e. resources that can have their operation or allocation controlled to achieve system performance goals. Examples of the system resources include, but are not limited to, network bandwidth, storage space, processing capacity, output capacity, input capacity, memory and combinations thereof. In one embodiment, the number of system resources available to be controlled and allocated to the identified resource demands is determined, i.e. m.

In order to monitor the level of system performance for compliance with SLA's and other system performance goals, one or more system performance metrics or measures are defined and used. The system performance metric can be any suitable analysis or measurement capable of evaluating the level of performance of the autonomic system, for example based on the allocation of two or more system resources among the plurality of system resource demands. In one embodiment, a system performance metric is a system performance equation defined to determine a level of performance of the system as a function of the allocation of two or more of the identified system resources among the plurality of identified system resource demands. For example, the allocation of the system resources among all identified resource demands is included in the system performance equation. In one embodiment, the system performance metric is composed of elements equal to the number of identified resource demands. In one embodiment having n resource demands, the system performance metric is composed of one or more n-dimensional vectors. Typically, it combines these vectors in a scalar function, which may be the sum of individual performance equations for the n resource demands, or some more complex function. In that case, the terms of the performance metric are a vector, $\bar{t}$, whose elements are summed. In the case of a more complex performance function, a non-additive function of the terms of $\bar{t}$ may be used.

Upon the initiation of the iterative loop to determine an improved set of resource allocations, a criterion can be established to dictate the point at which the iterations are to be stopped. Therefore, in one embodiment, stopping criteria are identified 38 and are initialized 40, for example by setting a counter to zero or initializing a value or range of values. In one embodiment, calculation of a set of allocations to improve or to optimize system performance in accordance with the exemplary embodiments of the present invention is conducted through an iterative process to achieve convergence towards a desired or an optimum allocation or level of performance. Therefore, in one embodiment, a convergence threshold is defined as one of the stopping criteria or the sole stopping criterion. Convergence can be measured from a single point or value or as a range of values. For example, a high and low point for a range of values can be established. Upon each iteration, a new value is obtained that is substitute for either the high or low point if that new value falls between the existing high and low point. The process is completed iteratively until the difference between the high and low points falls below a pre-determined value. Convergence can also be achieved for a given variable when the difference between subsequent iterative values of that variable falls below a pre-determined value. In another embodiment, the stopping criteria include an iteration counter. Therefore, a maximum number of iterations to be used in calculating an optimized set of resource allocations is defined. The actual iteration count, j, is initialized, for example by setting the number of iterations equal to one, i.e. j=1.

Having identified the desired stopping criteria, the iterative loop commences by identifying the current set of resource allocations for all of the identified resources 44. In one embodiment, the current, for example initial, set of resource allocations, x, is defined as an n by m matrix $x^1=(x_1, x_2, \ldots, x_m)$, where each $x_i$ is a n-dimensional vector. Therefore, a resource allocation is provided for each one of m resources and each of the n applications or resource demands.

Having defined a metric for the level of system performance based upon the utilization of all resources within the system, this system performance metric is used to determine a set of resource allocations that produces improved or optimum system performance as measured by this metric. A change in the allocation of any one resource affects both the level of system performance and the allocation of other system resources. Therefore, exemplary methods in accordance with the present invention evaluate the change caused in the system performance metric by a change in each one of the resource allocations on a resource-by-resource basis. Since evaluating the change associated with simultaneous changes in multiple resource allocations results in a complex problem, methods in accordance with the present invention look at the changes in the system performance metric attributable to a change in only one resource allocation at a time. In one embodiment, a plurality of resource-specific expressions is derived from the system performance equation 46. The resource-specific expressions provide the rate-of-change or the trends in change of the system performance metric attributable to changing or modifying a given resource allocation. In one embodiment, the number of resource-specific expressions is equal to the number of identified resources in the system. Each resource-specific expression is capable of expressing changes in the level of performance of the system attributable to changes in the allocation of one of the system resources. In one embodiment, each resource-specific expression is a resource-specific change equation, for example derived from the system performance equation. In this embodiment, for example, a plurality of partial derivatives of the system performance equation is taken. Each partial derivative is taken with respect to the allocation of one of the system resources: $\partial t/\partial x_1$, $\partial t/\partial x_2$, ..., $\partial t/\partial x_m$, where f is the l-dimensional function of the individual performance metric terms, t.

Each resource-specific expression, or resource-specific change equation, is evaluated to identify the resource-specific expression equation yielding the greatest change in the level of system performance at a given allocation of all of the system resources. In one embodiment, each resource-specific expression is evaluated using the current set of resource allocations 48. For example, each partial derivative is evaluated using the values in the current set of resource allocations. The evaluation of each one of the resource-specific expression yields a value, for example either positive or negative. The magnitude of the change caused in the system performance metric by a given resource-specific expression is indicated by the absolute value of that expression at the evaluation point. In order to converge as quickly as possible on a preferred level of system performance, methods in accordance with the present invention identify the resource that when changed has the greatest effect on the value of the level of system performance. Therefore, the resource-specific expression having the highest absolute value, highest absolute magnitude or greatest absolute rate-of-change when evaluated using the current set of resource allocations is identified 50. In an embodiment where each resource-specific expression is a resource-specific change equation expressed as a partial derivative of the system performance equation, the partial derivative having the highest absolute value is selected. The resource associated with the resource-specific expression having the highest absolute value is identified.

The allocation values for the identified resource are then determined to improve system performance 52. In one embodiment, allocation values are selected to increase the level of system performance as indicated by the system performance metric, i.e. to optimize system performance. The allocation of the identified associated system resource is then modified as determined to improve system performance 54. In one embodiment, the allocation of the selected system resource to at least one system resource demand is modified to provide the largest increase in the level of performance of the system. Having adjusted the allocation of one resource, allocations for all system resources are adjusted in accordance with the modified allocation of the identified associated system resource 56, creating an updated set of resource allocations. The current number of iterations is incremented 58. For any given iteration, the current set of resource allocations is represented as an updated n by m matrix $x^{j+1} = (x_1, x_2, \ldots, x_m)$, where the update is noted by the new superscript number, j+1.

In one embodiment, in order to modify the allocation of the resource identified as having the greatest effect on the level of system performance, a relationship between the identified associated system resource and the level of performance of the system is identified. This identified relationship is optimized to determine allocation of the identified associated system resource. The allocation of the identified associated system resource is modified in accordance with the relationship optimization. In one embodiment, adjusting allocations for all system resources further involves creating a system operating point comprising a set of system resource allocations among the plurality of resource demands and adjusting all system resources in accordance with the system operating point.

In one embodiment, in order to determine the necessary relationships between a given resource and its effects on the level of system performance, a model of this relationship between the given resource, e.g. the controlled resource, and the dependent parameters, e.g. dependent resources and other system parameters, is developed. This model, i.e. the estimated relationship between a controlled resource and the dependent parameters, is initialized to a simple linear function or some other preset function. This model is refined through an iterative process. During each iteration, the controlled resource allocation is set, and one or more sample measurements of the dependent parameters are obtained at this controlled resource allocation so as to learn the relationship between the controlled resource allocation and the dependent parameters. If more than one sample is taken, the samples are combined to reduce the impact of noise or inaccurate data. Suitable methods for combining the multiple samples include, but are not limited to, simple averaging and low-pass filtering. The controlled resource allocation and the dependent parameter measurement form a data object containing two or more components, i.e. a tuple.

After measuring the dependent parameters, the tuple containing the controlled resource allocation and the dependent parameter measurement is a data point in an n-dimensional space of real numbers, $R_n$. The model is updated by the addition of this tuple. In one embodiment, the list of previously-recorded tuples can be connected by line segments to form a piece-wise linear function which is suitable for use as a model. However, only a few such tuples of the piecewise-linear model need to be stored at any time. For example, when the goal involves trying to achieve a particular utilization level, which can be referred to as a target level, of a single dependent parameter which varies monotonically with a controlled resource, only two tuples need to be stored, a tuple representing a lower bound and a tuple representing an upper bound. The upper and lower bounds are located on either side of the target level. Therefore, the tuple with the largest observed dependent parameter measurement that is less than the target level is the lower bound, and the tuple with the smallest observed dependent parameter measurement that is greater than the target level is the upper bound. The method described will then choose a new allocation of the controlled resource which is predicted to result in a new tuple with the dependent parameter measurement between the current upper and lower bounds. Following each iteration, the new allocation becomes either the upper or the lower bound. With each successive iteration, the distance between the upper and lower bounds decreases, as the points which are computed by the method are successively closer to the target level.

Iterations continue until one of the pre-defined stopping criteria is reached. In general, a stopping criterion is associated with the best value of the controlled resource for achieving the system performance goal. Suitable stopping criteria may include, but are not limited to, a pre-determined distance from the target value, a maximum number of iterations, a maximum amount of elapsed real time and combinations thereof.

In one embodiment, the computing system includes a set of processes, e.g. running instances of some data-processing program, hosted on a single node. The controlled resource is network bandwidth, and the dependent resource is the central processing unit (CPU). The goal is a target number of CPU share on the node. An estimate of the relationship between the controlled resource and the values of the dependent resource is developed as opposed to estimating explicitly the relationships between many controlled resources and each dependent parameter. This approximation facilitates a very rapid method and requires minimal data storage. Interactions across controlled resources affect the system through a constraint on the total amount of controlled resource available, and through the noise in measurements.

More specifically, the goal of the system depends upon the unknown relationship between each dependent parameter and the controlled resource. The mapping describing each of these relationships is constructed iteratively, and the next value of the resource level is determined by examining the direction that leads to a value of the goal metric closer to the desired value.

At each iteration, sample measurements of the dependent parameters are taken at the current allocation of the controlled resource. As these measurements may be noisy, multiple measurements are taken. Using a statistical technique such as one which determines the expected value from a set of random measurements, a single expected value is obtained. One example of such a technique is to remove outliers. i.e. measurements more than a given number of standard deviations from the mean of the measurements, and then to take the mean of the remaining values.

The expected value is then used to update the model. The expected value adjusts the piecewise-linear function so that the new point, which is the controlled resource-goal value pair, is included in the model function. Therefore, the piecewise-linear function has as many segments with different slopes as the number of iterations plus one. For many goal functions, only two points need to be stored for each process since one segment of the relationship function contains the target value within its lower and upper limit. At each iteration, either the upper or lower limit will be updated by a new point which is closer to the target value. Hence, the distance between the two extremities of the active piece decreases following each iteration.

As an example, consider a single resource and a single process or application, i. Let $C_i(B_i)$ be a smoothed estimate, for example an expected value, of the $i^{th}$ component of the unknown relation between resource and performance for that application and that resource, i. $B_i$ represents the value of the controlled resource for that process. The performance function, which depends upon the unknown relation $C_i(B_i)$; is given by the notation $F(B)$. In one embodiment, the performance function includes n×m different components, e.g. i=1, 2, ..., n×m, each process i=1, ..., n having a relationship, for ever resource i=1 ... m, to be learned by the method, $C_i(B_i)$.

In one exemplary embodiment, the performance function is to achieve target values for the dependent parameter, $C_i$. The target values are referred to by the n-vector, T, and the iteration counter is initialized at the value 1, j=1. The particular relations below apply to that performance function. The initial controlled resource value is set to a given starting point $B_i$ or set to:

$B_i=(1/n)×$maximum_controlled_resource_capacity for every i=1, 2, ..., n if no initial point is provided. The initial values are defined as $C_i(LB(i))=0=0$ and $C_i(UB(i))=1$, for all i=1, 2, ..., n. Until the stopping criterion is reached, the following steps are repeated. The usage level of each i with the current vector B is sampled. For each process i=1, 2, ..., n, set $C_i(B_i)$ to the smoothed or expected usage level of process i. For each i=1, 2, ..., n, if $C_i(j)(B_i(j))<T_i$, the target level, then set UB(i)=j. Conversely, if $C_i(j)(B_i(j))>T_i$, then set LB(i)=j. The search direction, $G_j(b)$, is related to a derivative of subgradient of the performance function and, in the case of the exemplary embodiment described above, is determined such that $G_j(b)=(C(j)(B(j))-T)×Z(j)=(C(j)(B(j))-T)×M(j)$ where M is the vector of slopes of the piecewise-linear function C(B) evaluated in the direction towards the target value, T. That is, if, for process i the current iteration counter j is the upper bound, then $M_i(j)$ is the gradient of the segment between point $C_i(j)(B(j))$ and $C_i(LB(i))(B(LB(i)))$. Therefore, $M_i(j)=A_i(k)$ for some active piece k. Conversely, if j=LB (i), then $M_i(j)$ is the gradient of the segment between point $C_i(j)(B(j))$ and $C_i(UB(i))(B(UB(i)))$.

The Newton step is given by the gradient scaled by the norm of the Hessian. Since the goal function is modeled as one which is separable in the processes, the norm of the Hessian is given, for each process i, by the second derivative of the objective function F(j)(B) evaluated at the active piece, which is a relatively inexpensive and quick computation. The step size computation uses either a unit step or a divergent-series step, S(j)=w/(j+v), for some scalar constants, v and w. Updating is accomplished by setting B(j+1)=B(j)-G(j)(B)× S(j) and setting j=j+1.

In one exemplary embodiment, a relationship is estimated between at least one controlled resource and at least one dependent parameter. This relationship allows for the determination of how different allocations of the controlled resource affect the dependent parameter. A resource allocation of the controlled resource is adjusted to affect a desired system goal expressed in terms of the dependent parameter. A current allocation of the controlled resource is set, and at least one sample measurement of the dependent parameter is obtained at the current allocation. The sample measurement is combined with the current allocation to form a tuple. A new allocation is determined based on at least one previous tuple. These steps are repeated until the tuple satisfies a stopping criterion.

Returning to FIG. 2, since exemplary embodiments in accordance with the present invention are conducted as an iterative process, following the update of the set of resource allocations and the incrementing of the iteration count, a check is made to determined if the at least one of the stopping criteria is achieved 60. If the convergence threshold is achieved, then the resource allocation loop stops, and the method return to monitoring for a triggering event that will determine if another resource allocation loop should be initiated. If the non-of the stopping criteria is achieved, then the allocation loop repeats, for example by first identifying the current set of resource allocations 44.

In one embodiment, algorithms in accordance with exemplary embodiments of the present invention, build up a learned model of the relationship between the multiple resources and the service objective, while simultaneously optimizing the choice of value of the resources. To deal with the multiple resources all influencing the service objective, empirical partial derivatives are obtained at each major iteration, and the resource with the largest partial derivative in absolute value is identified. Then, the algorithm proceeds to determine the optimal change in the value of that resource for that process. Each process may have a different dominant resource, and the dominant resource may change for a single process at different points in the algorithm, i.e., for different values of the resources.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for autonomic system management in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for autonomic system management, the method comprising:

defining a system performance equation to evaluate a level of performance of an autonomic system as a function of the allocation of a plurality of system resources among a plurality of system resource demands, the plurality of system resources comprising processing resources and network resources;

calculating a plurality of partial derivatives of the defined system performance equation, each partial derivative taken with respect to allocation of one of the system resources;

identifying a system operating point comprising a set of system resource allocations among the plurality of resource demands;

evaluating each partial derivative at the system operating point;

identifying the partial derivative yielding the largest absolute value when evaluated at the system operating point;

identifying a system resource associated with the identified partial derivative;

determining a relationship between the identified associated system resource and the level of performance of the system;

optimizing the relationship to determine an allocation of the identified associated system resource;

modifying allocation of the identified associated system resource in accordance with the relationship optimization;

creating a system operating point comprising a set of system resource allocations among the plurality of resource demands based on the modified allocation of the identified associated system resource; and adjusting all system resources in accordance with the system operating point.

* * * * *